(12) United States Patent
Fabbri

(10) Patent No.: US 11,434,079 B2
(45) Date of Patent: Sep. 6, 2022

(54) SYSTEM AND METHOD FOR STORING WATER IN AN UNDERGROUND RESERVOIR AND MANAGING THE SAME

(71) Applicant: Next Tier Agribusiness, Bakersfield, CA (US)

(72) Inventor: Jeffrey S. Fabbri, Bakersfield, CA (US)

( * ) Notice: Subject to any disclaimer, the term of this patent is extended or adjusted under 35 U.S.C. 154(b) by 0 days.

(21) Appl. No.: 17/184,407

(22) Filed: Feb. 24, 2021

(65) Prior Publication Data
US 2021/0253354 A1 Aug. 19, 2021

Related U.S. Application Data

(63) Continuation-in-part of application No. 16/794,095, filed on Feb. 18, 2020, now abandoned.

(51) Int. Cl.
| | | |
|---|---|---|
| *B65G 5/00* | (2006.01) | |
| *E03B 11/14* | (2006.01) | |
| *E03B 3/02* | (2006.01) | |

(52) U.S. Cl.
CPC .............. *B65G 5/005* (2013.01); *E03B 11/14* (2013.01); *E03B 3/02* (2013.01)

(58) Field of Classification Search
CPC .......... B65G 5/00; B65G 5/005; E03B 11/14; E03B 3/02; E03B 3/08; Y02A 20/406; E02B 11/00
See application file for complete search history.

(56) References Cited

U.S. PATENT DOCUMENTS

| | | | |
|---|---|---|---|
| 4,180,348 A | 12/1979 | Taylor | |
| 4,669,536 A | 6/1987 | Ames et al. | |
| 5,059,064 A * | 10/1991 | Justice | E02F 5/10 |
| | | | 405/37 |
| 5,209,605 A * | 5/1993 | Cherrington | E21B 21/12 |
| | | | 405/129.85 |
| 5,228,802 A | 7/1993 | Kuwabara et al. | |
| 6,357,969 B1 | 3/2002 | Wheeler, Jr. et al. | |
| 6,422,318 B1 * | 7/2002 | Rider | E21B 7/20 |
| | | | 166/369 |
| 6,840,710 B2 | 1/2005 | Peters et al. | |
| 7,042,234 B2 | 5/2006 | Buss | |
| 7,192,218 B2 | 3/2007 | Peters et al. | |
| 7,493,954 B2 | 2/2009 | Heller et al. | |
| 7,967,989 B2 | 6/2011 | Gong et al. | |
| 8,074,670 B2 | 12/2011 | Peters et al. | |
| 8,337,121 B2 | 12/2012 | Poerio et al. | |
| 9,146,206 B2 | 9/2015 | Rhodes et al. | |
| 9,278,808 B1 | 3/2016 | McIntyre et al. | |

(Continued)

*Primary Examiner* — Carib A Oquendo
(74) *Attorney, Agent, or Firm* — James M. Duncan; Scanlon Duncan LLP

(57) ABSTRACT

An underground water storage system is installed with directional drilling techniques to dispose water conveying conduits within an aquifer. By conducting a pre-installation investigation of the aquifer, the conduits may be placed within the aquifer to increase the flow efficiency into the aquifer, such as orienting the position of the conduits to coincide with the orientation of the aquifer. The invention may have a system for preventing water invasion into the near surface soil layers, thereby preventing water instrusion which may be detrimental to desired surface uses for the land, such as agricultural, recreational, residential or commercial uses.

19 Claims, 4 Drawing Sheets

(56) References Cited

U.S. PATENT DOCUMENTS

| | | | |
|---|---|---|---|
| 9,371,185 B2* | 6/2016 | Gu | B65G 5/00 |
| 9,689,235 B1 | 6/2017 | Ayotte | |
| 2005/0173124 A1 | 8/2005 | McDonald | |
| 2012/0261125 A1* | 10/2012 | Divine | B09C 1/002 |
| | | | 166/279 |
| 2014/0064852 A1* | 3/2014 | Livvix | A01G 25/06 |
| | | | 405/51 |

* cited by examiner

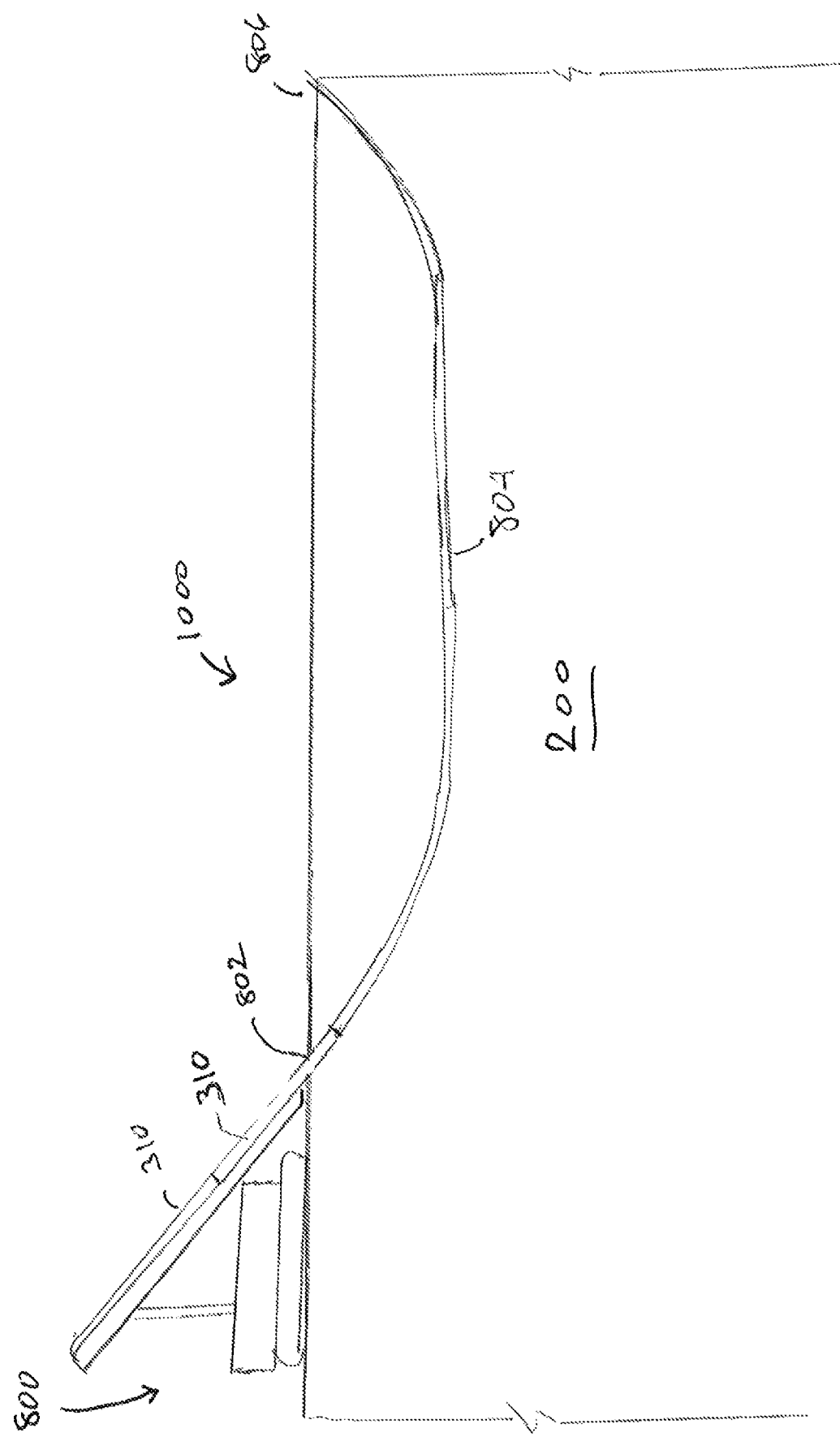

SYSTEM AND METHOD FOR STORING WATER IN AN UNDERGROUND RESERVOIR AND MANAGING THE SAME

PRIOR APPLICATIONS

This is a continuation-in-part application to currently pending application Ser. No. 16/974,095 filed on Feb. 18, 2020 which claims priority to application Ser. No. 16/456,604 filed on Jun. 28, 2019 and issued as U.S. Pat. No. 10,597,231 on Mar. 24, 2020 which claims priority to application Ser. No. 15/705,195 filed on Sep. 14, 2017 and issued as U.S. Pat. No. 10,336,544 on Jul. 2, 2019.

BACKGROUND OF THE INVENTION

The present invention relates to underground storage of water and more specifically to a system and method which directs water to underground storage zones having available storage capacity. Embodiments of the presently disclosed system and method further may be directed toward water storage in land where the land surface is utilized for other purposes, such as for agricultural use, commercial construction, recreation, or where the surface of the land has been restored, thereby making efficient use of the land by allowing the concurrent use of the surface and subsurface. Embodiments of the presently disclosed system and method further may be directed toward the installation of a system of piping for directing water into an underground storage zone without disturbing any activity, crops, improvements, fixtures, or restored surface features of the land surface overlying the underground storage zone. Embodiments of the presently disclosed system and method may also be directed toward the installation of a system for directing water into an underground storage zone where the surface or topography of the land overlying the underground storage zone is inaccessible for installation activities because of terrain and/or topography of the surface of the parcel.

In the face of growing demand for water and the statutory and regulatory framework which address groundwater sustainability, industries which rely on groundwater, especially agriculture, recognize the need to increase surface water imports and expand underground water storage capacity. Underground water storage reservoirs provide an alternative to storage of water in open reservoirs. Underground water storage reservoirs, i.e., aquifers, will have one or more porous and permeable layers. Porosity and permeability are the aquifer properties which, respectively, refer to the pore volume available for water storage and the hydraulic conductivity of the aquifer. For utilization for underground water storage, an underground zone must have available pore space and water must be able to flow through the zone to be recovered for utilization for irrigation or other use.

Groundwater recharge is a water management tool by which surplus surface water supplies are stored underground for later recovery during periods of reduced water supply. Recharge reduces or eliminates the need to construct costly surface reservoirs which are prone to excessive evaporation losses, particularly in arid climates in the Western United States. With heavy rain or snow fall, water must be released from surface reservoirs must be released to make room for inflow. Recharge has the added benefit of improving water quality by filtration through underlying sediments.

In general, if farmers and municipalities and quasi-municipalities, such as water districts, irrigation districts and water storage districts (collectively "water districts") are able to conserve water and bank some of their allocation, they will be able to reclaim it later, either for their own use or for sale. In programs offered by some water districts, incentives are offered to private landowners to provide groundwater recharge facilities for banking surplus water for future extraction. These programs typically anticipate that water will be delivered to the private recharge facilities through district-owned distribution systems and that the water will be introduced into the underground reservoir by surface recharge basins. However, the water district may also store surface water for others within district-owned recharge facilities and the water district receive benefit for storing the groundwater.

The surface recharge basins are typically open, unfarmed, fallow land. Thus, land utilized for providing recharge to the aquifer is typically dedicated nearly exclusively for that purpose and other surface uses for the land inhibited or completely excluded.

As opposed to surface recharge basins, some recharge facilities introduce the water into the underground reservoir by piping systems. This type of system expedites introduction of the water into the aquifer and thereby reduces evaporation losses. However, depending upon the design of the water storage facility, the underground reservoir may still require the dedication of significant areas of real property. Moreover, such systems do not, without additional control mechanisms or structure, identify the particular zones or depth into which the water is introduced. Identifying the zones or depth into the water is introduced can be a significant issue if the underground water storage facility is beneath a land surface utilized for agricultural purposes because saturation of the root-zone can be detrimental to the health of a crop. Other surface uses may also be adversely impacted by the intrusion of stored groundwater into the near surface region, such as surface uses for recreation and residential and commercial development.

With the above factors in mind, it is desirable to develop additional underground storage for groundwater. It would also be beneficial to be able diminish water loss through evaporation, to determine where the water is going and how much storage capacity remains and, in some cases, to receive alarms when a particular aquifer is full and ground water is approaching the surface so that water may be directed to alternative water storage facilities. In addition, the incentives offered by the above-described programs typically credit the owner of the banking and recharge facility with a "banked water account credit" which is a percentage of the water banked in the facility. While the transferability and fungibility of these credits is evolving throughout the country with the development of sustainable groundwater policies, in general the credits are a valuable asset realized by owners of groundwater recharge facilities, and a method which facilitates obtaining such credits is desirable.

SUMMARY OF THE INVENTION

In contrast to other known underground water storage systems and methods of utilizing the same, embodiments of the present invention provide for the delivery and storage of water into an aquifer disposed in parcels of land but without significant disturbance of the land surface or the activities being conducted on the land surface. For example, the present method provides for the installation of water storage distribution piping without any significant disruption of the ground surface overlying the aquifer. The disclosed method thereby allows the underground water storage system to be installed where the land surface is actively being utilized for agricultural, recreational, residential, commercial purposes or other uses where the land surface has improvements or fixtures which preclude or discourage installation activities. The present method may also be utilized where the land surface overlying the aquifer is environmentally sensitive, has been environmentally restored, or where there are topographical features which limit the surface activity required to install a system of water distribution piping.

Embodiments of the present invention may utilize a piping system to deliver water from a remotely located water storage facility, such as those maintained by water storage districts and irrigation districts to embodiments of the disclosed system. In the case of water stored by or on behalf of a quasi-municipality, such as a water district, rights to stored water may be reclaimed, transferred, sold, etc. as groundwater recharge credits.

Embodiments of the present invention may also utilize water invasion control systems to detect moisture, groundwater invasion and/or monitor the moisture levels in different underground zones. These control systems may actively prevent the oversaturation of upper soil layers, such as rootzones and upper soil layers utilized for construction of structures or other facilities. The water invasion control systems may suspend water flow into the aquifer if water infiltration begins or if the moisture content in the near-surface zone approaches an undesirable threshold. Through the use of digital control means and actuated valves, the water flow may be redirected into other groundwater recharge zones or into surface containment facilities.

In addition, embodiments of the present invention may control the underground zones into which water is introduced and may maintain a record of the water volumes introduced into specific zones. Embodiments of the present invention may also, through the use of multiple moisture detectors, monitor the remaining storage capacity and provide an automated alert to the property owner, a water district, or others when the storage capacity reaches a designated level. Upon reaching the designated level, recharge water may be directed to an alternative storage facility as directed manually or automatically.

Embodiments of the present invention may further incorporate subsurface pumps which can remove water from a particular zone either for use or for redirecting to a different location in the aquifer or to a surface containment facility in the event the aquifer is at its storage limit.

The aquifer may have one or more layers, where each layer has a particular porosity for storing water and a particular permeability, which is the characteristic of the layer which allows water to flow through the interstices of the layer. Orientation of the aquifer layers is defined herein as the attitude of the layers, in three-dimensional space. The sedimentary rock layers in which aquifers are typically found obey the laws of superposition, original horizontality, and lateral continuity. The law of original horizontality predicts that the original orientation of essentially all rock strata was horizontal. For this reason, if rock strata is found with some orientation other than horizontal, a force has acted upon the rock strata to re-orient it (change it from its original state).

The below-ground piping systems of the present invention are configured to be in a complimentary disposition with respect to the orientation of the aquifer, or with those portions of the aquifer having the greatest porosity and permeability, whereby long sections of conduit are oriented in accord with the orientation of the desired aquifer strata. Thus, it is desirable to maximize the surface area of conduit with respect to the corresponding surface area of the desired strata of the aquifer strata, such that water is efficiently released uniformly within the lateral reach of the desired strata. Accomplishing this goal may utilize the pre-installation investigation discussed below.

Piping systems of the present invention may be installed utilizing directional drilling techniques which enable segments of discharge piping to be installed at nearly horizontal orientations, thereby greatly increasing the rate of water discharge to the subsurface aquifer. With these techniques, boreholes for the pipe segments of the piping system may be drilled by a drilling rig located offsite (i.e., not located on the land surface overlying the subsurface aquifer). The drilling unit will be capable of drilling angled boreholes such that the boreholes may be initiated from the remote location with the borehole being directed, at an angle, to penetrate the strata overlying the subsurface aquifer. These boreholes may turn upwardly at the opposite end such that the borehole penetrates the ground surface at the end opposite the drilling rig to form an "exit hole". Once the boreholes are completed or partially completed, piping segments utilized in the piping system are directed into the boreholes by the drilling unit, with the piping segments installed in an end-to-end configuration, forming a continuous "string" of pipe in a particular borehole. The pipe string may be installed by feeding the pipe into the borehole at the drilling rig location and, optionally, pulling the pipe string from the "exit hole".

The piping segments may comprise slots for release of the water into the surrounding ground surface. Alternatively, the piping segments may be perforated or otherwise slotted by tools inserted into the string of pipe by the drilling unit. Embodiments of the method may further include pre-installation investigation of the strata of the aquifer as well as the strata overlying the subsurface aquifer. This pre-installation investigation may include a review of geophysical well logs and/or well cuttings from any water wells or oil wells in the vicinity of the aquifer. The pre-installation investigation may also include the drilling of boreholes into the aquifer and strata adjacent to the aquifer. These pre-installation steps may provide important information regarding the orientation, structure and continuity of the strata, the presence of any faults or geologic unconformities, and the permeability and porosity of the strata. The pre-installation investigator thereby facilitates placement of the distribution piping at optimal locations with respect to the subsurface aquifer to maximize flow to the aquifer. The pre-installation investigation provides valuable information regarding the optimal placement of the distribution piping for maximizing flow into the subsurface aquifer and the best placement of the moisture detectors to detect offsite flow, invasive flow, or upward flow into a crop root-zone.

BRIEF DESCRIPTION OF THE DRAWINGS

FIG. 4 schematically depicts an apparatus drilling a segment of a borehole which may be utilized for disposition of piping segments used to transfer water to a subsurface aquifer.

DETAILED DESCRIPTION OF THE INVENTION

Figure 1:
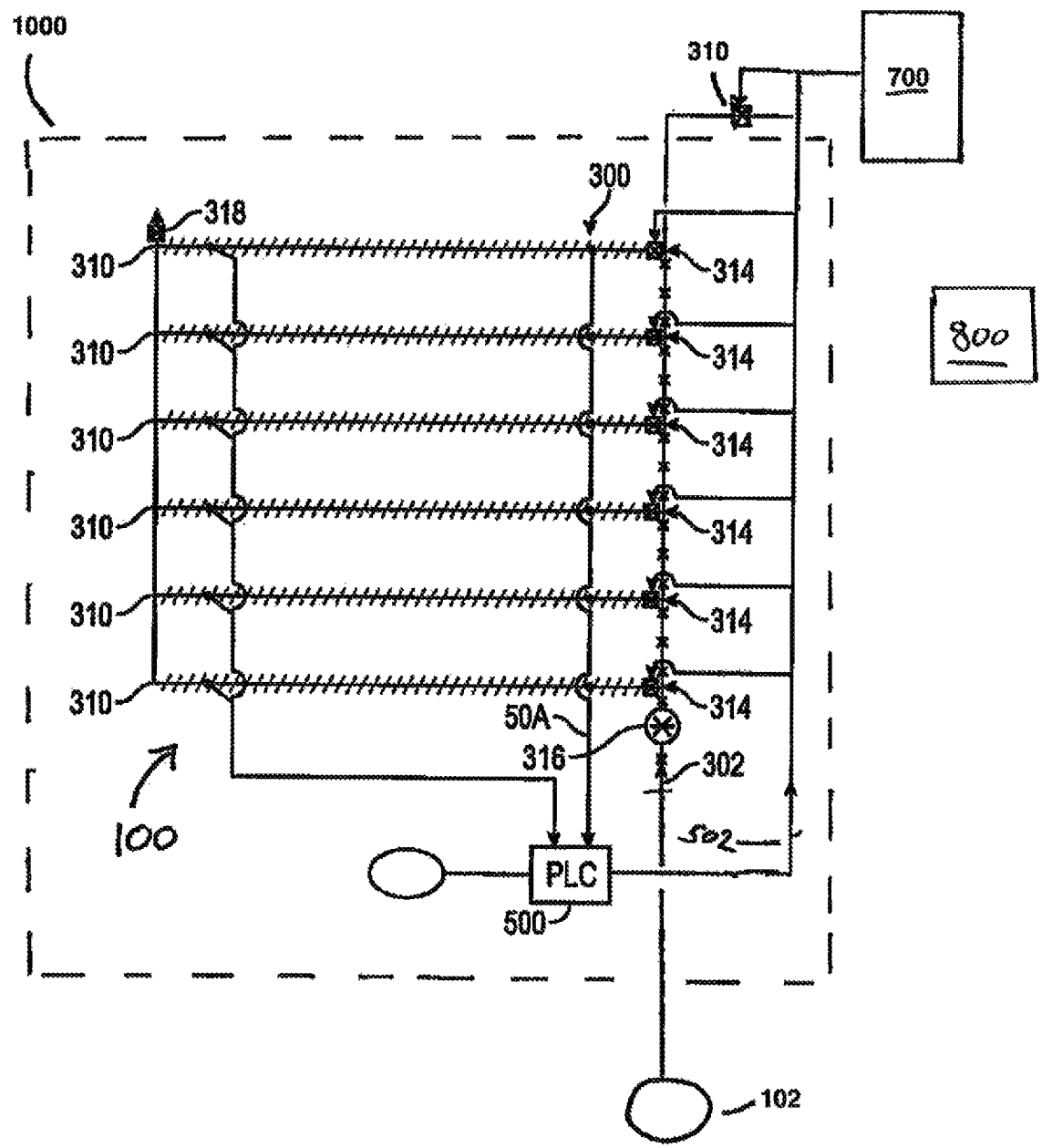
FIG. 1 schematically depicts an embodiment of a system which may be utilized or constructed according to the disclosed method.

Referring now to the figures, FIG. 1 schematically depicts an embodiment of a water system 100 which is located beneath a land parcel 1000. Land parcel 1000 may have a developed surface use which may include agricultural, recreational, residential, commercial purposes or other uses where the land surface has crops, trees, improvements or fixtures which preclude, inhibit or discourage installation activities for a subsurface piping network. Land parcel 1000 may also be dormant or comprise terrain and/or topography is not easily accessed for installation of the subsurface piping network. In either case, underground piping segments utilized for delivery of water to the subsurface reservoir may be accomplished by utilization of a directional drilling unit 800 capable of drilling nearly horizontal boreholes, where the directional drilling unit is located offsite of land parcel 1000, such as being located on land adjacent to the land parcel 1000. Directional drilling unit 800 may be mobile and configured to move to a variety of locations for drilling the boreholes beneath land parcel 1000.

The water system 100 may be connected to a water storage facility 102 which is remote from land parcel 1000. Water storage facility 102 may be a surface containment structure, such as a tank, holding pond, catch basin, etc. Alternatively, water supply 102 may be a flowing water source including a pipe, culvert, or drainpipe operated either by the owner of the water system 100 or by a third-party such as a water district or a private landowner. Water supply 102 may also comprise structures which capture water which would otherwise be lost to sewers and storm drains. For example, the water supply 102 may capture runoff from roofs and roads through gutters and French drains. As another alternative, water supply 102 may be a water system which is configured the same as water system 100. It is to be appreciated that embodiments of the water system 100 may utilize a variety of different forms of water supply 102, but in each case water supply 102 is remotely located from land parcel 1000. These forms of remotely located surface water storage facilities may include surface reservoirs The water system 100 comprises a subsurface aquifer 200, such as that schematically shown in FIG. 2. Aquifer 200 is disposed below land parcel 1000. Aquifer 200 may comprise multiple layers which may include a first porous and permeable layer 202 ("first layer") which has a general depth (or elevation) of $D_1$. First layer 202 will have generalized properties of porosity and permeability which will impact the water storage capacity of the first layer as well as the ability of water to flow through the layer vertically and laterally, potentially flowing into the rootzone 206. Aquifer 200 may also have a second porous and permeable layer 204 ("second layer") which has a general depth of $D_2$. The second depth may be deeper than the first depth, but the first depth could be deeper, or the depths of the two layers could be approximately the same in case of laterally adjacent layers.

As part of the pre-installation investigation, or as part of an investigation conducted to monitor or expand embodiments of the water system 100, geophysical data may be collected and analyzed to ascertain the geologic properties of the aquifer 200 and adjacent strata to ascertain, among other factors, structural configuration, zone thickness, permeability, porosity, lithology, chemical properties of the strata and any in situ fluids, fluid invasion from adjacent parcels, etc. These investigations may be conducted utilizing data obtained from geophysical logs of water wells and hydrocarbon wells in the vicinity of the aquifer and/or well cutting obtained in the drilling of such wells. In addition, boreholes or potholes may be drilled prior to installation of the system for the express purpose of obtaining soil and/or fluid samples, or for determining the geologic structure of the aquifer and adjacent strata. The pre-installation investigation may further include field studies and mapping. Among other uses, this information may be utilized to ascertain the best positions and depths for the piping segments and moisture detectors utilized in embodiments of the system.

The generalized properties of porosity and permeability of second porous and permeable layer 204 may be approximately the same as those for first layer 202, or the generalized properties may be different, which means a difference between the water storage capacity of the of the second layer 204 and the first layer 202, and the ability of water to flow through the layers. These differences mean that the second layer 204 may have less or more capacity to store water than the first layer 202. As discussed below, these differences in water storage capacity demonstrate the desirability of separately ascertaining the moisture content of each layer.

Figure 3:
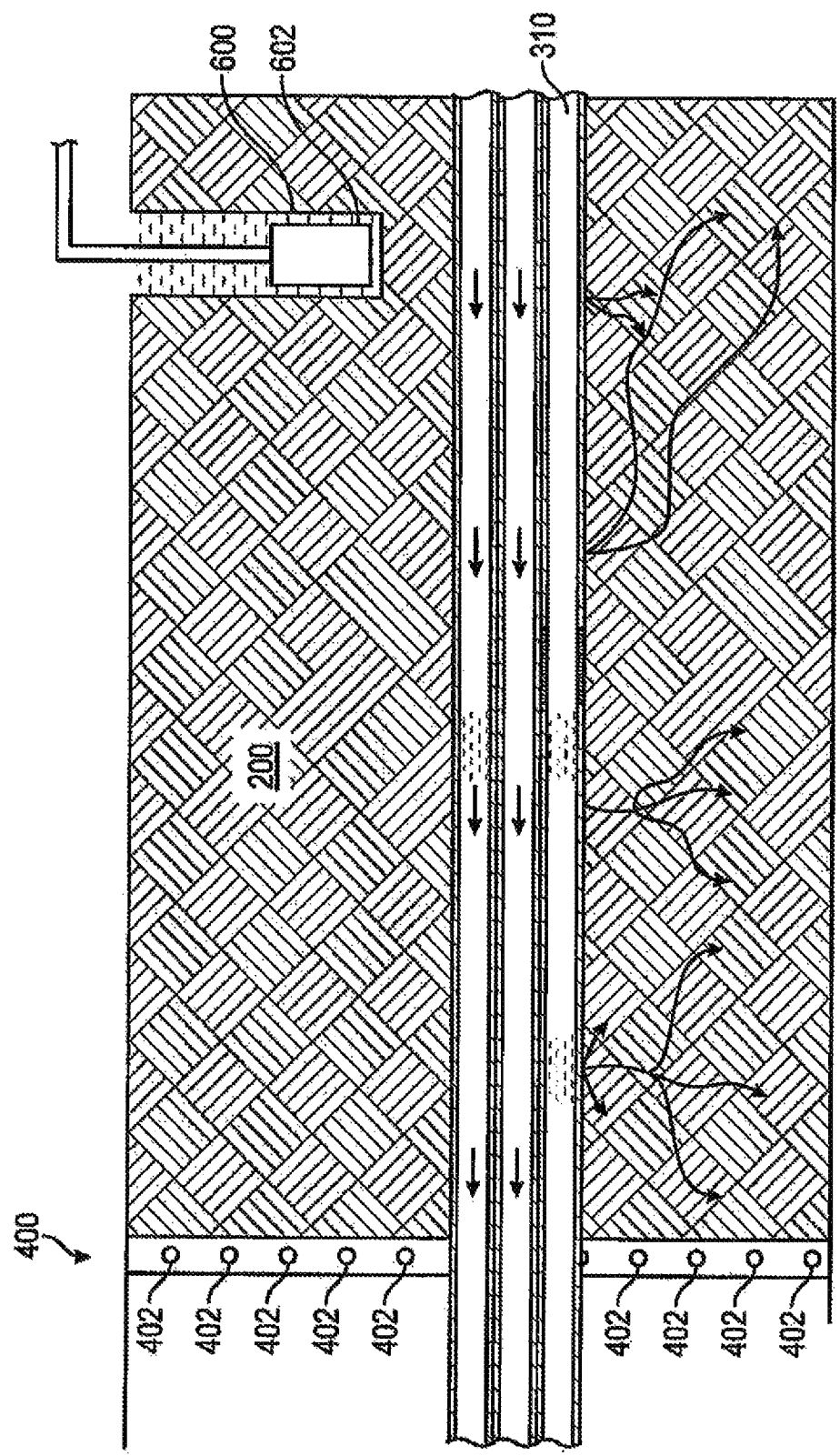
FIG. 3 is a cross-sectional view of a segment of an embodiment of a piping system which may be utilized or constructed according to the disclosed method.

Water system 100 includes a piping system 300 comprising an array of conduit members, such as piping segments 310 shown in FIG. 3, where each conduit member has an outlet into the subsurface aquifer 200. Piping system 300 conveys water from the water supply 102 and distributes the water to various points within the aquifer 200, placing the water supply 102 in hydraulic communication with the aquifer 200. Piping system 300 may have one or more inlets 302 which receive water flow from water supply 102. Inlet 302 may be located on land parcel 1000 or located offsite adjacent to water supply 102 or adjacent to locations utilized for placement of directional drilling unit 800 and the borehole inlets 802.

Figure 2:
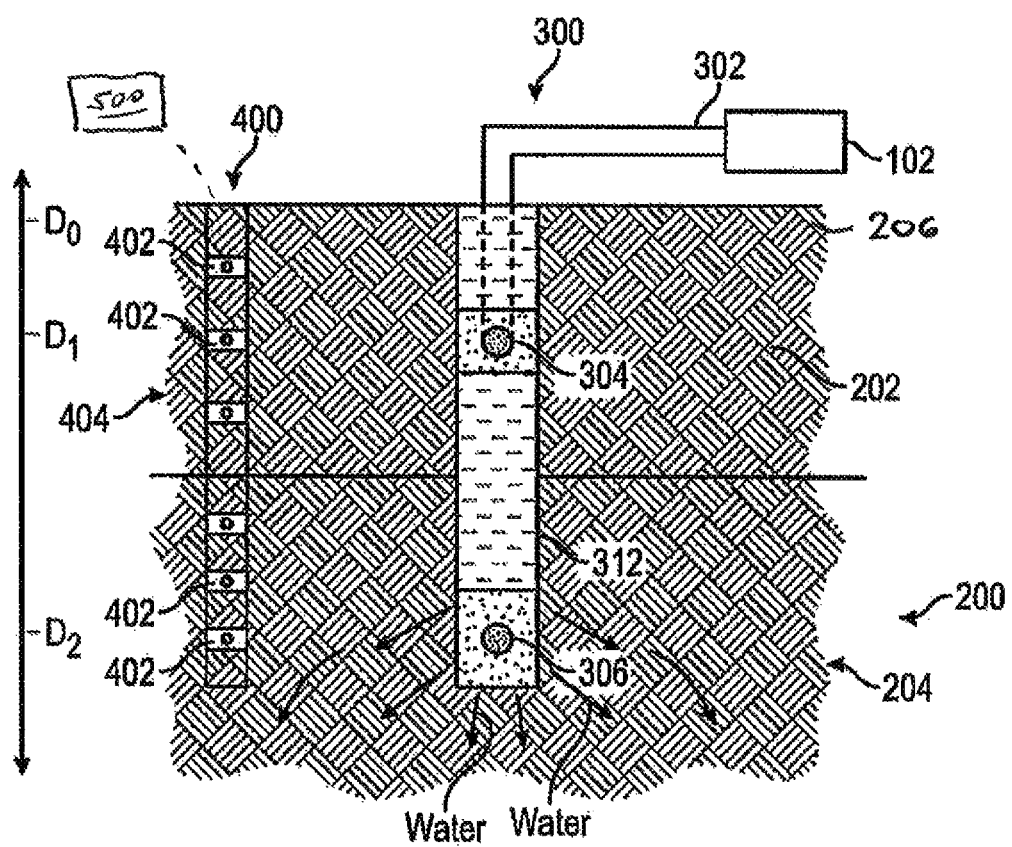
FIG. 2 is an elevational view of an outlet of an embodiment of a piping system for discharging water into a porous and permeable layer which may be utilized or constructed according to the disclosed method.

Inlet 302 will be set at an elevation Do which may, but not necessarily, be the approximate ground elevation. Elevation Do may be at a higher elevation relative to the depths of the first layer 202 and second layer 204 to allow gravitational flow into the aquifer 200. Piping system 300 may deliver water to an outlet 304 disposed within first layer 202. Likewise, piping system 300 may deliver water to an outlet 306 disposed within second layer 204. Outlets 304 and 306 may directly release water into the first layer 202 and the second layer 206, or outlets 304 and 306 may be directly connected to piping segments 310 which transmit water laterally through the aquifer. Although only two layers 202, 204 are shown in FIG. 2, it is to be appreciated that embodiments of the water system 100 have comprise an aquifer 200 having many more layers and may have one or more outlets or piping segments disposed within each layer.

Water system 100 may further comprise a system for preventing water invasion into the near surface soil layers such as rootzone 206. Such system may comprise a moisture detector 400, a digital processor 500 and flow control valves 314. Moisture detector may have multiple sensors 402 in a single housing 404. Sensors 402 may be disposed at different depths such that moisture content for a specific layer 202, 204, the rootzone 206 or at different depths within an individual layer may be detected and monitored. Each sensor 402 within moisture detector 400 may generate an output signal associated with a moisture observed at a particular time and depth. The moisture detector 400 may transmit the output signal to a digital processor 500 located at the surface.

Moisture detector 400 may be of the type which detects the presence of moisture and provides a notification of the same. Alternatively, moisture detector 400 may be of the type, such as a neutron probe device, which provides quantitative information regarding the amount of the moisture. Moisture detector 400 may be of the capacitive type which uses metallic rings as the plates of a capacitive element. The multiple sensors 402 of moisture detector are located at various depths for a specific layer and provide a profile of the soil moisture of the layer. Such moisture detectors are described, among other references, in U.S. Pat. No. 7,042,234 to Buss and U.S. Pat. No. 9,146,206 to Rhodes et al. and available through several sources including SENTEK. Embodiments of the invention may also utilize neutron probe type devices for measuring moisture, or hybrid devices which employ the technology of both capacitive and neutron probe devices.

As indicated in the figures, a section of land overlying an aquifer 200 may have a piping system 300 which provides a conduit for transmission of water from a remote (i.e., located off of land parcel 1000) water supply 102 to a variety of outlets disposed within the aquifer. Piping system 300 may be set entirely below the ground surface, thereby allowing the ground surface of land parcel 1000 to be utilized for other purposes. As indicated above, piping system 300 may have a plurality of generally horizontal segments 310 which deliver water to the areal extent of the aquifer 200. The piping segments may be installed in horizontal boreholes which are drilled by a direction drilling unit 800 which is not located on land parcel 1000, but at a location which is conducive for the drilling operation and installation of the piping segment. Piping system 300 may also have a plurality of generally vertical segments 312 which deliver water to specific depths of the aquifer or to outlets which are connected to the horizontal segments 310. Horizontal segments 310 and vertical segments 312 may form an intersecting matrix capable of delivering water to the lateral and depth limits of the aquifer 200.

Horizontal segments 310 and vertical segments 312 may comprise segments of perforated pipe which are set within gravel in either trenches or holes. Alternatively, the horizontal segments 310 and vertical segments 312 may have a plurality of discrete outlets for release of water at specific lateral locations and or depths within the aquifer 200.

As suggested by FIG. 1, an embodiment of the presently disclosed water system 100 may provide automated management of a water storage aquifer 200. Water from water supply 102 is provided either by pump (not shown) or by gravitation into piping system 300. Piping system 300 has one or more flow control valves 314 which are instructed by digital processor 500 to open, close, decrease flow or increase flow with the instructions provided by a control signal provided through either hard-wire connection 502 or by wireless transmission. Upon the opening of one or more control valves 314, water flows from water supply 102 into piping system 300. Flow control valves 314 may be set below the ground surface at land parcel 1000 to allow complete use of the land surface of land parcel 1000 or control valves 314 may be located offsite of land parcel 1000.

A water flow meter 316 may provide observed water flow rates to digital processor 500, which may have a volume totalizing algorithm which monitors total water volume delivered to aquifer 200 over a given time period. Piping system may further have a flush valve 318 to expedite draining or cleaning the piping system. Piping system 300 may be connected to overflow reservoir 700 which allows water to be directed elsewhere if desired, such as if aquifer 200 has reached capacity. Overflow reservoir 700 may either be a surface containment, a recharge basin, or a separate downhole storage reservoir.

As indicated by FIG. 1, a plurality of flow control valves 314 may be utilized to control water flow into various segments or layers of the aquifer. It is to be appreciated that while FIG. 1 appears as a plan view of a piping system, the piping segments connected to the flow control valves 314 may be horizontal segments 310 and/or vertical segments 312. The outlets 304 of a vertical segment 312 may be discrete, as opposed to a slotted pipe segment, such that separate layers of a vertical section of the aquifer 200 may be independently recharged with water. The moisture content of a specific layer may be observed with moisture detector 400 and reported back to digital processor 500 by wire connection 504 or wireless transmission. Upon receipt of this data a determination made by the digital processor whether additional water may be introduced into that specific layer or, conversely, water flow should be suspended and/or water withdrawn from that layer.

Using FIG. 2 by way of example for the system for preventing water invasion into rootzone 206, moisture sensors 402 may report to digital processor 500 that the lower portion of first layer 202 is full is not taking additional water and the moisture level near the surface is increasing. If the surface is used for agricultural purposes or other uses which are sensitive to water invasion of the near surface soil, the moisture content may be monitored near the rootzone to prevent undesirably high moisture levels near the rootzone or ground surface. Upon receipt of this data, the digital processor 500 may instruct a first flow control valve 314 to stop or reduce water flow to first layer 202. The digital processor 500 may likewise instruct a second flow control valve 314 to increase water flow to second layer 204. The digital processor 500 may also start an electric submersible pump 602 set within a subsurface water well 600 to pump down the water in the aquifer 200. The digital processor 500 may further instruct control valve 320 to open to allow flow into overflow reservoir 700.

The above-described system may be utilized for water storage management, where data is provided to a digital processor 500 of the storage capacity and moisture content of an aquifer 200. Upon receipt of this data, through the utilization of the piping system 300, flow control valves 314, moisture detectors 400 and other devices, the digital processor 500 may be utilized to direct the flow of water into discrete portions of the aquifer and/or to withdraw water from portions of the aquifer which have no available storage capacity. The water storage management may include the recharging of groundwater for third parties in exchange for groundwater recharge credits.

FIG. 4 depicts a mobile directional drilling unit 800 which has drilled a directional borehole 804 having borehole inlet 802 and borehole outlet 806. In one embodiment of the method of the invention a string of horizontal piping segments 310 may be installed by the directional drilling unit 800 into borehole 804 which is adjacent or penetrating into the subsurface aquifer 200. Installation of the string of horizontal piping segments 310 may be facilitated by pulling the string at borehole outlet 806.

Having thus described the preferred embodiment of the invention, what is claimed as new and desired to be protected by Letters Patent includes the following:

What is claimed is:

1. A method of storing water in an aquifer located beneath a parcel of land having a ground surface utilized for growing crops wherein a rootzone depth is defined as a soil depth to which a plurality of roots of the crops penetrates below the ground surface, wherein at least a portion of the water is maintained for availability for subsequent withdrawal from the aquifer, the method comprising the following steps:

collecting data comprising a depth to the aquifer, a general lateral orientation of the aquifer, an approximate lateral extent of the aquifer, and an approximate water storage capacity of the aquifer;

drilling a borehole below a ground surface of the parcel of land;

directionally controlling the orientation of the borehole with respect to the depth and general lateral orientation of the aquifer;

installing a piping member into the borehole, wherein the piping member is configured to release water into the aquifer;

installing a moisture detector at the rootzone depth;

receiving a flow of water; and directing at least a portion of the flow of water into the piping member for release into the aquifer.

2. The method of claim 1 wherein the borehole comprises an inlet, wherein the inlet is not located on the parcel of land.

3. The method of claim 2 wherein the borehole comprises an outlet.

4. The method of claim 1 wherein the borehole has an approximate horizontal orientation.

5. The method of claim 1 comprising the further step of measuring the at least a portion of the flow of water directed into the piping member.

6. The method of claim 5 comprising the further step of calculating a groundwater recharge credit from a total volume of water directed into the piping member.

7. The method of claim 1 wherein the borehole is drilled with a directional drilling rig not located on the parcel of land.

8. The method of claim 1 wherein the parcel of land has a surface use selected from the group consisting of agricultural, commercial, residential, and recreational.

9. The method of claim 1 wherein the moisture detector provides an output signal to a programmable controller if a threshold level of moisture is detected in the rootzone.

10. The method of claim 9 wherein said programmable controller instructs a valve apparatus to stop the flow of water into the piping member upon a detection of the threshold level of moisture in the rootzone.

11. A method of storing water in an aquifer located beneath a land parcel utilized for growing crops, the aquifer having an orientation, wherein a rootzone depth is defined as a soil depth to which a plurality of roots of the crops penetrates below a ground surface, the method comprising the following steps:

drilling a borehole below the ground surface of the land parcel;

directionally controlling an orientation of the borehole with respect to the orientation of the aquifer;

installing a piping member into the borehole, wherein the piping member is configured to release water into the aquifer;

receiving a volume of water;

flowing at least a portion of the volume of water into the piping member for release into the aquifer; and installing a moisture detector in the rootzone to detect any flow of the volume of water into the rootzone.

12. The method of claim 11 wherein the moisture detector provides an output signal to a programmable controller if a threshold level of moisture is detected in the rootzone.

13. The method of claim 12 wherein said programmable controller instructs a valve apparatus to stop the flow of water into the piping member upon a detection of the threshold level of moisture in the rootzone.

14. A system of storing water in an aquifer located beneath a land parcel utilized for growing crops, wherein a rootzone depth is defined as a soil depth to which a plurality of roots of the crops penetrates below a ground surface, the system comprising:

a directionally drilled borehole disposed beneath the ground surface, a piping member disposed within the borehole, the piping member configured to receive a flow of water from a source and release at least a portion of the flow of water into the aquifer;

a moisture detector disposed at the rootzone depth, the moisture detector configured to detect any flow of water into the rootzone depth from the water released into the aquifer and, upon a detection of any flow of water into the rootzone depth, to generate an output signal, said moisture detector further configured to transmit the output signal to a programmable controller; and a valve apparatus controlled by the programmable controller, valve apparatus configured to start or stop the flow of water into the piping member upon receipt of an instruction from the programmable controller.

15. The system of claim 14 wherein the borehole has an orientation approximately the same as an orientation of the aquifer.

16. The system of claim 14 wherein the borehole comprises an inlet, wherein the inlet is not located on the parcel of land.

17. The system of claim 14 wherein the borehole has an approximate horizontal orientation.

18. The systems of claim 14 wherein the borehole has an outlet.

19. The system of claim 14 comprising an apparatus for measuring the flow of water received by the piping member.

* * * * *